United States Patent
Chilamakuri et al.

(10) Patent No.: US 11,645,137 B2
(45) Date of Patent: May 9, 2023

(54) EXCEPTION MANAGEMENT IN HETEROGENOUS COMPUTING ENVIRONMENT

(71) Applicant: SAP SE, Walldorf (DE)

(72) Inventors: Sateesh Babu Chilamakuri, Tirupati (IN); Sathya G, Kerala (IN)

(73) Assignee: SAP SE, Walldorf (DE)

( * ) Notice: Subject to any disclaimer, the term of this patent is extended or adjusted under 35 U.S.C. 154(b) by 78 days.

(21) Appl. No.: 17/244,689

(22) Filed: Apr. 29, 2021

(65) Prior Publication Data

US 2022/0350692 A1    Nov. 3, 2022

(51) Int. Cl.
*G06F 11/00* (2006.01)
*G06F 11/07* (2006.01)
*G06F 11/30* (2006.01)

(52) U.S. Cl.
CPC ...... *G06F 11/0772* (2013.01); *G06F 11/0784* (2013.01); *G06F 11/0787* (2013.01); *G06F 11/3082* (2013.01)

(58) Field of Classification Search
CPC ............. G06F 11/0772; G06F 11/0784; G06F 11/0787
See application file for complete search history.

(56) References Cited

U.S. PATENT DOCUMENTS

| | | | | |
|---|---|---|---|---|
| 6,006,016 A | * | 12/1999 | Faigon | G06F 11/2252 714/39 |
| 9,798,607 B1 | * | 10/2017 | Kulkarni | G06F 11/0778 |
| 2003/0056200 A1 | * | 3/2003 | Li | G06F 11/323 714/E11.181 |
| 2020/0201699 A1 | * | 6/2020 | Yu | G06F 11/0769 |

OTHER PUBLICATIONS

"Client (computing)," Wikipedia, https://en.wikipedia.org/wiki/Client_(computing), printed Mar. 11, 2021, 3 pages.
"Client-server model," Wikipedia, https://en.wikipedia.org/wiki/Client-server_model, printed Mar. 11, 2021, 6 pages.
"Common Object Request Broker Architecture," Wikipedia, https://en.wikipedia.org/wiki/Common_Object_Request_Broker_Architecture, printed Feb. 15, 2021, 14 pages.
"Managing Exceptions in Distributed Applications," An Oracle White Paper, Mar. 2010, 13 pages.
"What Is an Exception?", https://docs.oracle.com/javase/tutorial/essential/exceptions/definition.html, What is an Exception? (The Java™ Tutorials > Essential Classes > Exceptions), printed Mar. 15, 2021, 3 pages.

* cited by examiner

*Primary Examiner* — Philip Guyton
(74) *Attorney, Agent, or Firm* — Klarquist Sparkman, LLP (57) ABSTRACT

A computer-implemented method includes feeding exception log entries from a plurality of exception logs associated with respective heterogenous computing components into an aggregated exception log comprising aggregated exception log entries, mapping an aggregated exception log entry in the aggregated exception log to a corresponding exception identifier, identifying a descriptor describing an exception condition based on the exception identifier, determining one or more destinations corresponding to the aggregated exception log entry, and routing a notification comprising the descriptor to the one or more destinations.

18 Claims, 8 Drawing Sheets

EXCEPTION MANAGEMENT IN HETEROGENOUS COMPUTING ENVIRONMENT

BACKGROUND

Exception handling (also referred to as error handling) is an important feature in any computing system. Modern enterprise systems involve many different hardware components and software applications, the scale of which can be too complex to be error free. When an exception or error occurs, proper administrators must be informed and provided sufficient information about what happened, where it happened and why it happened so that the administrators can take appropriate actions to diagnose and fix the underlying problems. However, as enterprise systems become more complex, especially when the systems include heterogenous products from different vendors, it becomes increasingly difficult to handle exceptions in an efficient manner. Accordingly, there remains a need for an improved system and method for exception management in a heterogenous computing environment.

DETAILED DESCRIPTION

Example 1—Overview of Exception Management in Computing Systems

Modern enterprise systems use many different tools to analyze and visualize data and make prompt decisions based on the data analysis. Such tools can be standalone applications or applications associated with an enterprise system adopting the client-server model, where a server provides resources and services to a plurality of clients through a predefined communication protocol. As described herein, servers refer to any device or computer program that can provide functionality or share resources for other devices or programs, such as web servers (for hosting webpages), database servers (for hosting and sharing databases), computing servers (for sharing computing and or memory resources), application servers (for hosting web applications), etc., and clients refer to any computer or software application that can send a request to a server and receive information or access a service made available by the server.

Exception management is a key feature in any enterprise system, which aims to detect errors in real-time when they occur and to obtain sufficient information to quickly diagnose and fix the underlying problems. An exception is an error event, which occurs when executing a program, that disrupts the normal flow of the program's instructions. When an exception occurs within a method, the method can throw an exception by creating an exception object and passing it to the runtime system. The exception object contains information about the error event. For example, the exception object can provide an error code (also referred to as "exception code") that identifies the error type and the state of the program when the error event occurred. After a method throws an exception, the runtime system can search a call stack (also referred to as a "stack trace"), which includes an ordered list of methods that had been called, to find the method where the error event occurred and execute a corresponding error handling routine (to catch the exception) if it is included in the method. Typically, an exception log entry containing the exception object and the corresponding call stack can be recorded in a corresponding exception log file for debugging purposes. After the occurrence of an exception in an enterprise system, it is important to promptly resolve the underlying issue(s), especially if the exception affects a critical function and/or domain of the business. Delay of resolving the exception, especially when it happens during automated processes such as scheduling, can negatively impact decisions makings, frustrate customers, and/or disrupt business operations. Unfortunately, such delay is not uncommon in modern enterprise systems.

Typically, an enterprise system adopting the client-server model can include many layers of products or components (e.g., web applications, operating systems, back-end servers, databases, etc.), which may be provided by different vendors. Each product or component provided by a specific vendor can have its own predefined exception handling mechanism, e.g., to process and analyze the error conditions, and/or store the related error information. Such enterprise system represents as a heterogenous computing environment. Such heterogenous computing environment becomes increasingly common nowadays as it has become a norm for companies to purchase suites of products from diverse sources, integrate new products after mergers or acquisitions, and/or update/migrate certain products for whatever reasons.

As described herein, a heterogenous computing environment refers to a computing system that includes a plurality of heterogenous computing components that share no centralized exception handling mechanism. In certain examples, the plurality of heterogenous computing components can be different products and/or components sourced from different vendors (e.g., an operating system provided by Microsoft, a database provided by Oracle, an enterprise resource planning software provided by SAP, etc.). In certain examples, some of the heterogenous computing components can be different products/or components provided by the same company (e.g., SAP S/4HANA, SAP SuccessFactors, SAP Business Intelligence, all from SAP SE, of Walldorf, Germany). In certain examples, some of the heterogenous computing components can be from the same line of product but with different versions. In any case, a plurality of computing components are deemed to be heterogenous when there is no centralized exception handling mechanism that operates across the plurality of computing components.

In such heterogenous computing environment, when an exception occurs, it will usually be logged in its respective domain, e.g., a dedicated trace log service that is specific to the product where the exception occurs. To resolve the underlying issues, responsible domain administrator(s) must be called upon to analyze the trace log service and figure out what is the root cause of the exception and what are the plausible solutions. However, several factors can delay the exception handling process. In one aspect, the responsible domain administrator(s) may not timely receive the alert of the exception because the trace log service merely passively logs the exceptions. For example, consider a scenario in a cloud computing system where certain deployed components were purchased from independent vendors, and the system throws a failure exception "DB-0783-Max connection has reached" while scheduling a report. In this scenario, the responsible administrator(s) may not even know that the scheduled report has failed until an end user checks manually or when the scheduled document is missing. In another aspect, error message may be presented in one layer while the underlying exception may occur in another layer. For example, when a user running a web application receives an error message that database connection is lost, the underlying exception may not occur in the web application itself. Instead, the exception may occur in a backend database server, or in a middleware that connects the web application to the database server. Because different domain administrators may be responsible for the maintenance of different products in an enterprise system, it may become necessary for a system administrator to first identify the source of the exception before notifying an appropriate domain administrator who is responsible for the product. Because of the heterogenous computing environment, the system administrator may have to examine the respective exception logs stored in multiple products in order to pinpoint the source of the exception. Such delay in exception handling can create pressure in failure analysis, cause confusion in failure management, and lead to more system downtime.

Thus, it would be advantageous for an improved system and method for more efficient exception management in a heterogenous computing environment so that whenever an exception occurs, relevant information of the exception can be promptly routed to the responsible administrator(s) who can act on such information to resolve the underlying issue(s). Such improved exception management technologies can be applied across a wide variety of enterprise software environments.

Figure 1:
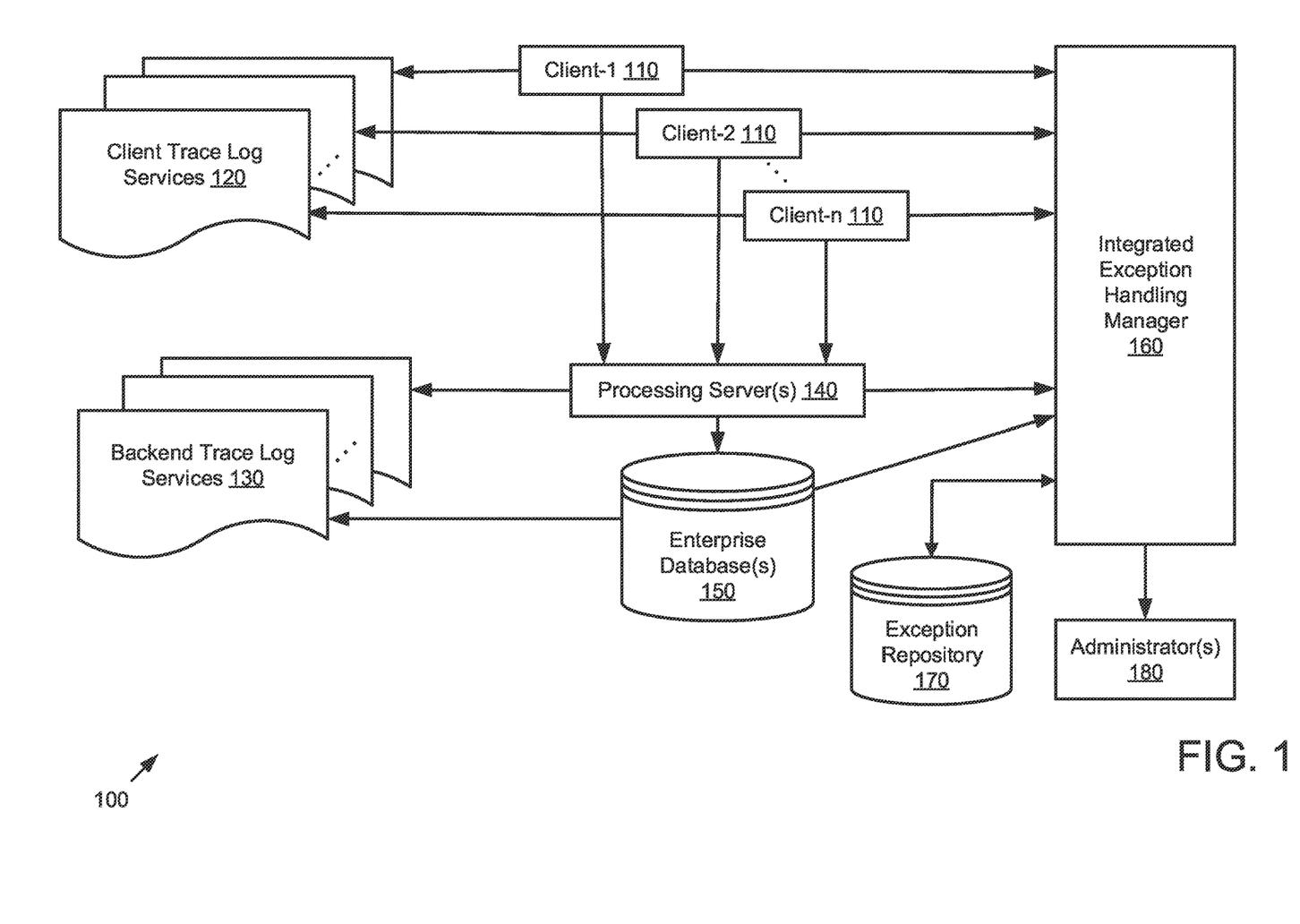
FIG. 1 is an overall block diagram of an example exception management system in a heterogenous computing environment.

Example 2—Example Overview of an Exception Management System in Heterogenous Computing Environment FIG. 1 shows an overall block diagram of an example exception management system 100 in a heterogenous computing environment.

As shown, a plurality of clients 110 can request services from one or more processing servers 140, which can communicate with enterprise database(s) 150. Information of the clients 110 and the processing servers 140 can be stored on the enterprise database(s) 150. In addition, at least some of the clients 110 and/or the processing servers 140 can access (e.g., read and/or write) data stored in the enterprise database(s) 150. The plurality of clients 110 can have corresponding client trace log services 120. In an example embodiment, each client 110 can have its own trace log service 120, which logs exceptions occurred on that client 110 in a corresponding exception log. In addition, the processing servers 140 and the database(s) 150 can have respective backend trace log services 130. For example, the processing servers 140 can include a web application server, a computing server, and a database server, each of which can be have its own backend trace log service 130 configured for logging exceptions occurred on that server in a corresponding exception log.

In certain examples, the plurality of clients 110 can be developed and/or provided by different vendors, and the processing servers 140 can also be sourced from different vendors. Thus, the plurality of clients 110, the processing server(s) 140, and the enterprise database(s) 150 can be collectively referred to as heterogenous computing components of the system 100. The client trace log services 120 and backend trace log services 130 typically do not communicate with each other. Instead, the trace log services 120 and 130 merely maintain exception logs in their respective domains in isolation from each other. Conventionally, when a user experienced a failure condition, a system administrator may need to review individual exception logs generated by both 120 and 130 to pinpoint where the failure occurs, and then notify responsible domain administrator(s) who can further analyze exception log entries contained a relevant exception log to troubleshoot the failure condition.

As shown, the improved exception management system 100 includes an integrated exception handling manager 160 (also referred to as "integrated exception handling service"), which can be in direct communication with the plurality of clients 110, the processing server(s) 140, and the enterprise database(s) 150. As a result, each exception, whether it is surfaced from one of the clients 110 or one of the processing servers 140, can be sent in real-time to the integrated exception handling manager 160—in addition to being logged in a corresponding exception log that is specific to the client or processing server which is the source of the exception. In other words, an exception can be simultaneously logged in a domain specific exception log (e.g., via a respective trace log service 120 or 130) and fed into the integrated exception handling manager 160. Accordingly, the integrated exception handling manager 160 can aggregate exception log entries from a plurality of exception logs associated with respective clients 110 and the processing server(s) 140 into an aggregated exception log.

The integrated exception handling manager 160 can include a registration unit (as described below), through which the heterogenous computing components (e.g., the clients 110 and the processing servers 140) can be registered. Based on such registration, all known exceptions of these heterogenous computing components and information relevant to such exceptions (e.g., exception definitions, recommendations, and reference notes) can be stored in an exception repository 170 that is maintained by the integrated exception handling manager 160. In the example depicted in FIG. 1, the exception repository 170 is a separate unit (e.g., a standalone database) that is external to the integrated exception handling manager 160. Alternatively, the exception repository 170 can be an integral part (e.g., a non-transitory computer readable media) of the integrated exception handling manager 160.

The integrated exception handling manager 160 can also include an alert generator (as described below), through which an alert can be triggered after receiving an exception from one of the clients 110 and the processing servers 140. As described further below, the alert can include detailed description about the exception and additional information that can be helpful in addressing the exception, and the alert can be promptly routed to one or more administrators 180 who are deemed responsible to resolve the underlying issues.

In practice, the systems shown herein, such as system 100, can vary in complexity, with additional functionality, more complex components, and the like. For example, there can be additional functionality within the integrated exception handling manager 160. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the exception logs, the exception code maps, the reference notes, and the like can be stored in one or more computer-readable storage media or computer-readable storage devices. The technologies described herein can be generic to the specifics of operating systems or hardware and can be applied in any variety of environments to take advantage of the described features.

Figure 2:
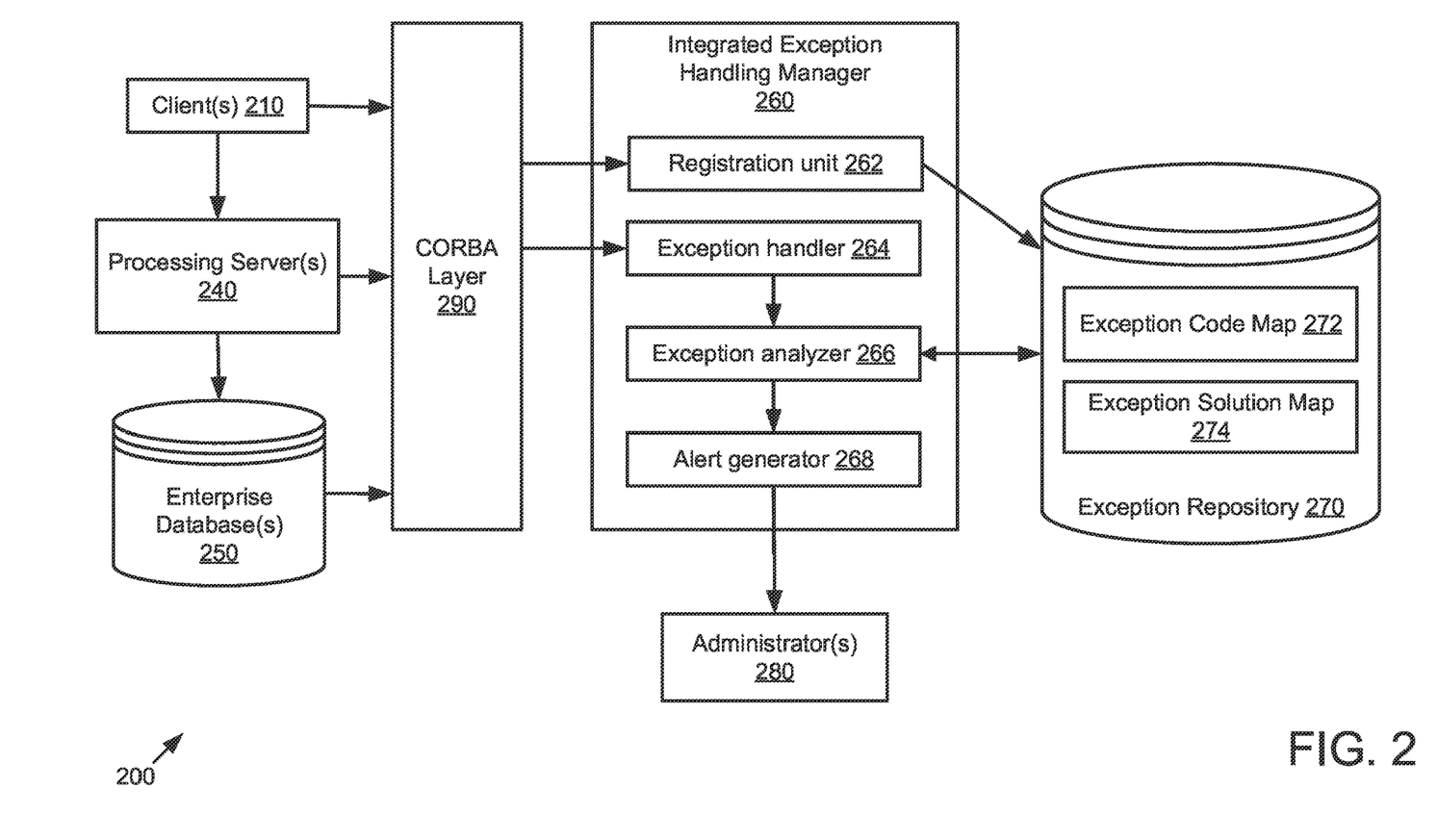
FIG. 2 is an example block diagram illustrating an integrated exception handling service in connection with a client-server computing system.

Example 3—Example Integrated Exception Handling Service in Heterogenous Computing Environment FIG. 2 shows an example block diagram of a computing system 200 including an integrated exception handling manager 260 (which can be an example embodiment of 160) in connection with a client-server computing system comprising client(s) 210, processing server(s) 240, and enterprise database(s) 250. As shown, the integrated exception handling manager 260 can include a registration unit 262, an exception handler 264, an exception analyzer 266, and an alert generator 268.

As described herein, the integrated exception handling manager 260 can be hosted as a service across heterogenous computing components. For example, multiple clients 210, multiple processing servers 240, and/or multiple enterprise databases 250, even if they are from different vendors, can be connected to the integrated exception handling manager 260 based on a standard interface definition language (IDL). In the example depicted in FIG. 2, the client(s) 210, processing server(s) 240, and enterprise database(s) 250 are all connected to the integrated exception handling manager 260 via an interface layer 290 adopting the Common Object Request Broker Architecture (CORBA).

Each time there is a change of the computing components in the system 200, such change can be registered by the registration unit 262. For example, whenever a new client 210, a new processing server 240, or a new database 250 has been added to the system 200, or whenever an existing client 210, an existing processing server 240, or an existing database has been updated to a new version, the new or updated client 210, processing server 240, or database 250 can be registered by the registration unit 262. Through the registration process, all known exceptions of the new or updated computing component, as well as information relevant to such exceptions (e.g., exception definitions, recommended solutions, reference notes, etc.) can be retrieved from the new or updated computing component and stored in an exception repository 270 (which can be an example embodiment of 170) maintained by the integrated exception handling manager 260. Thus, the exception repository 270 can serve as a centralized database that aggregates all known exceptions and related information from all heterogenous computing components in the system 200. Such aggregated known exceptions and related information can be further organized in an exception code map 272 and an exception solution map 274, as described further below.

After a computing component is registered with the registration unit 262, whenever an exception occurs at that computing component, the exception is sent to the exception handler 264 (in addition to logging the exception to a corresponding exception log through a trace log service specific to that computing component, as noted above). The exception handler 264 can record the received exception as a new exception entry in an aggregated exception log maintained by the integrated exception handling manager 260.

Then, the exception analyzer 266 can analyze the new exception entry in the aggregated exception log to identify the source of the exception (i.e., which computing component generated the exception), what is the cause of the exception, and in some cases, any plausible solutions that may help resolve the exception. To perform such exception analysis, the exception analyzer 266 can compare the new exception entry with data stored in the exception repository 270, as described further below.

The results of such exception analysis can be provided to the alert generator 268. Based on the results of exception analysis, the alert generator 268 can determine which administrator(s) 280 are responsible for such exception, generate a notification containing relevant information about the exception, and send the notification to the responsible administrator(s) 280 (also referred to as "destination(s)") who can then troubleshoot and resolve the exception condition based on the information contained in the notification.

In certain embodiments, the responsible administrator(s) 280 for various exceptions sent from the computing components (e.g., 210, 240, 250) to the integrated exception handling manager 260 can be domain specific and predefined. For example, one or more dedicated server administrators can have predefined roles to main the operating system of a processing server (and sometimes the applications running on the processing server as well), and may also be in charge of troubleshooting any hardware, operating system or application-related problems related to the processing server. In another example, one or more network administrators can have predefined roles to maintain the network infrastructure of the system (e.g., routers, switches, etc.) and troubleshoot any network-related problems. In yet another example, one or more database administrators can have predefined roles to maintain the enterprise database(s) 250. In still another example, one or more security systems administrators can maintain the daily operation of security systems and can handle tasks such as systems monitoring, running regular backups, managing (e.g., creating, deleting, modifying, etc.) individual user accounts, and developing organizational security procedures. In yet a further example, one or more web administrators can have predefined roles to maintaining websites (e.g., monitoring the traffic of the website, authorizing all content before it is published, etc.). Thus, based on the results of exception analysis (e.g., which computing component threw the exception, what type of exception), and sometimes based on the workflow of the system, the alert generator 268 can determine which administrator(s) (or destination(s)) need to be notified of the exception. In certain embodiments, mapping from the received exceptions to proper destinations can be implemented in a lookup table. In certain embodiments, determining the destination(s) of an exception can be implemented using a heuristic method based on predefined rules.

Figure 3:
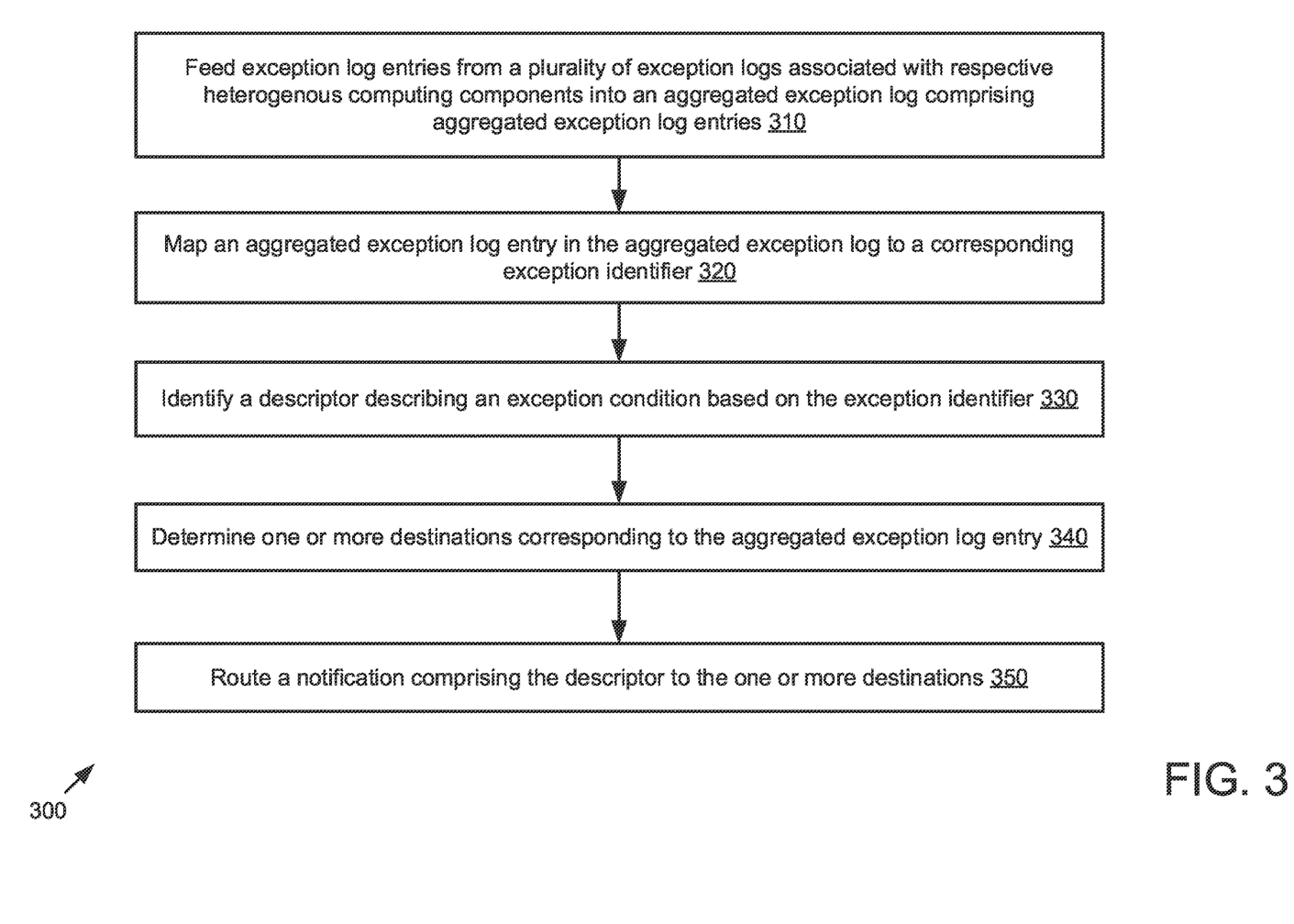
FIG. 3 is a flowchart illustrating an example overall method of implementing exception management in a heterogenous computing environment.

Example 4—Example Overall Method of Implementing Exception Management in Heterogenous Computing Environment FIG. 3 is a block diagram 300 illustrating an overall method of implementing exception management in a heterogenous computing environment, and can be performed, for example, by the system of FIG. 1 and/or FIG. 2.

At 310, exception log entries from a plurality of exception logs associated with respective heterogenous computing components can be fed into an aggregated exception log comprising aggregated exception log entries. For example, as described above in relation to FIG. 1, the integrated exception handling manager 160 can register heterogenous computing components (e.g., the clients 110 and the processing servers 140), and then aggregate exception log entries from a plurality of exception logs associated with respective heterogenous computing components into an aggregated exception log. In certain embodiments, the aggregated exception log can be saved in a text file. As noted above, an exception log entry can include information about a corresponding exception object and a stack trace that can be searched by the runtime system to find the exception handler.

At 320, an aggregated exception log entry in the aggregated exception log can be mapped to a corresponding exception identifier. Mapping from the aggregated exception log entry to the corresponding exception identifier can be implemented, for example, by the exception analyzer 266 of FIG. 2. As described herein, the exception identifier is any label(s) or tag(s) that can uniquely identify or represent the corresponding exception log entry. In certain embodiments, the exception identifiers can be respective exception codes (or error codes) associated with the heterogenous computing components. For example, a client or a server can have a plurality of predefined exception codes representing respective error events that are known to occur at the client or the server. When such an error event occurs, the corresponding exception code can be included in the respective exception log entry. As described below, the exception codes of all computing components registered with the integrated exception handling manager (e.g., 160 or 260) can be included in an exception code map. In certain embodiments, the exception identifiers can be respective index words (also referred to as "keywords" or "index terms" or "key terms") that are extracted from the respective exception log entries. As described further below, such index words can be used to uniquely represent the exception log entry from which they are extracted and search relevant reference notes to construct an exception solution map.

At 330, a descriptor describing an exception condition can be identified based on the exception identifier. As described herein, the descriptor can be derived from the exception code map or exception solution map, and contain useful information that can be used by responsible administrator(s) to resolve the exception condition.

At 340, one or more destinations corresponding to the aggregated exception log entry can be determined. As noted above, the destinations can identify administrator(s) who are responsible to handle the corresponding exceptions sent from the computing components, and they can be domain specific and determined based on the results of exception analysis and/or workflow of the system.

Then at 350, a notification comprising the descriptor can be routed to the one or more destinations. In certain embodiments, the notification can be in the form of an email or other electronic format that can be readily reviewed by the receivers. In an example embodiment, the notification can be presented in an XML or JSON format.

The method depicted in 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 5—Example Exception Code Map and Solution Map

Figure 4:
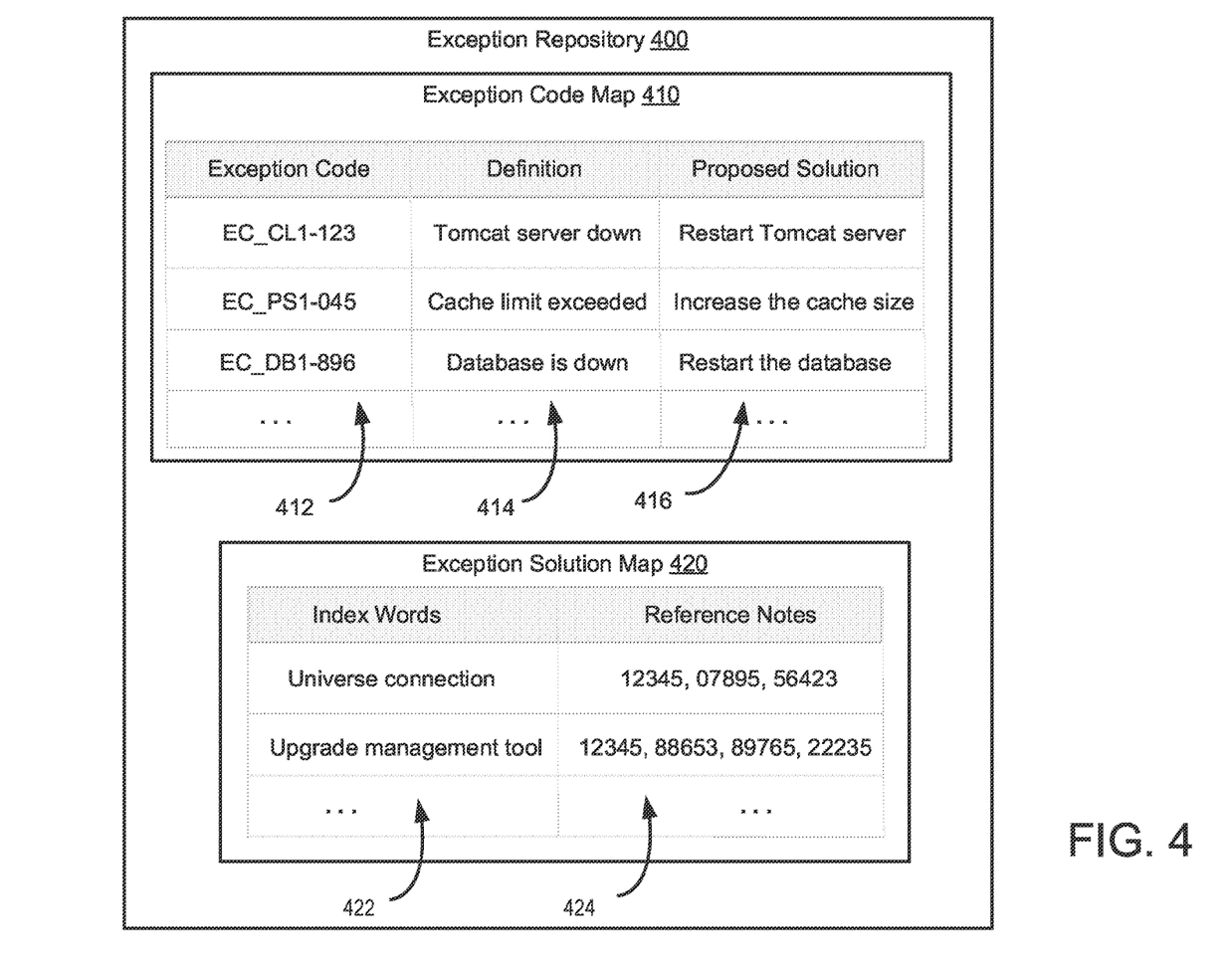
FIG. 4 is an example diagram illustrating an exception code map and an exception solution map included in an exception repository.

FIG. 4 shows an example exception repository 400 (which can be an example embodiment of 270) maintained by an integrated exception management manager (e.g., 160 or 260). As shown, the exception repository 400 can include an exception code map 410 and an exception solution map 420.

In the depicted example, the exception code map 410 includes a table having a plurality of columns such as "Exception Code," "Definition," "Proposed Solution," etc. The column of "Exception Code" can contain a collection of predefined (and known) exception codes 412 associated with all computing components registered with the integrated exception management manager. As noted above, some of the exception log entries received by the integrated exception management manager can include respective exception codes 412, which can serve as exception identifiers for the corresponding exception log entries. The exception analyzer 266 can be configured to extract the predefined exception codes 412, e.g., via string matching, from the exception log entries.

The "Definition" column of the exception code map 410 can include exception definitions 414 corresponding to the corresponding exception codes 412. In the depicted example, the exception definitions 414 for the exception codes 412 "EC_CL1-123," "EC_PS1-045" and "EC_DB1-896" are "Tomcat server down," "Cache limit exceeded," and "Database is down," respectively. Because the exception codes 412 are domain specific and the exception definitions 414 provide more contextual description about the corresponding exception codes 412, the responsible administrator(s) can identify the source of an exception (i.e., where the exception occurs) based on a respective exception code 412 and/or the corresponding exception definition 414.

The "Proposed Solution" column of the exception code map 410 can include brief instructions on proposed solutions 416 for the underlying error condition. For example, the proposed solutions 416 for the exception codes 412 "EC_CL1-123," "EC_PS1-045" and "EC_DB1-896" are "Restart Tomcat server," "Increase the cache size," and "Restart the database," respectively.

For an exception log entry mapped to an exception code 412 contained in the exception code map 410, a descriptor can be derived from the exception code map 410, and such descriptor can be included in the notification routed to the responsible administrator(s). In certain embodiments, the descriptor can include the exception code 412, the exception definition 414 and the proposed solution 416 corresponding to the exception code 412. Thus, upon receiving the notification, the responsible administrator(s) not only can identify the source of the exception generating the exception log entry, but also be advised of proposed solutions that can help resolve the underlying issues.

The exception repository 400 can also include a collection or library of reference notes related to all heterogenous computing components registered with the integrated exception management manager. The reference notes can be provided by respective vendors of the corresponding computing components. As described herein, a reference note refers to a published or archived documentation (e.g., provided by the vendor of a computing component), which typically includes answers to frequently asked questions, how-to guides, and troubleshooting instructions. Example reference notes include SAP Notes and SAP Knowledge Base Articles for products offered by SAP SE, of Walldorf, Germany In certain embodiments, the descriptor described above can further include links (e.g., hyperlinks), titles, and/or other identifiers of the reference notes which provide more detailed information related to the exception code 412 so that the responsible administrator(s) can further consult with the relevant reference notes if necessary.

As shown, the exception solution map 420 includes a plurality of records that can be represented by rows of a database table, where each record includes one or more index words 422 and a corresponding list of reference notes 424 containing the index words 422. In some circumstances, an exception log entry may not contain any predefined exception code 412. This can happen, for example, when a computing component experienced an unexpected failure event, and the method which threw the exception contains no error handling routine. When the exception log entry contains no exception code 412, index words 422 can be extracted from the exception log entry, e.g., by the exception analyzer 266.

As described herein, index words 422 can include one or more words, a phrase, or an alphanumerical term that captures the essence of the exception log entry. In certain embodiments, the exception analyzer 266 can be configured to extract index words 422 by identifying text following certain predefined token words (e.g., "Caused by") or matching other predefined textual patterns. In certain embodiments, the reference notes in the exception repository 400 include a list of keywords and/or exception/error strings that have been previously identified based on workflow or applications. The exception analyzer 266 can be configured to extract index words 422 by searching for those keywords and/or exception/error strings. As described herein, when the exception log entry contains no exception code 412, the index words 422 extracted therefrom can serve as a unique exception identifier for the corresponding exception log entry.

Then, the exception analyzer 266 can further search the collection or library of reference notes to identify which reference notes contain the extracted index words 422. In some circumstances when too many reference notes contain the extracted index words 422, the exception analyzer 266 can be configured to identify the most N relevant reference notes, e.g., based on the counts or frequency of extracted index words 422 appeared in respective reference notes, where N can be 1, 2, 3, or other predefined number.

The list of reference notes 424 can include links, titles, and/or other identifiers of the reference notes corresponding to the extracted index words 422. For example, in FIG. 4, the index words "Universe connection" has three reference notes identified as 12345, 07895, and 56423, and the index words "Upgrade management tool" has four reference notes identified as 12345, 88653, 89765, and 22235.

The integrated exception management manager described herein can construct the exception solution map 420 based on the extracted index words 422 and corresponding list of reference notes 424 containing the index words 422. In an example embodiment, the exception solution map 420 can be initialized as an empty table. Then, new records are added to the exception solution map 420 anytime new index words are extracted from an exception log entry and the corresponding list of reference notes are identified.

For example, after receiving an exception log entry that contains no exception code, the integrated exception management manager can first extract index words from the exception log entry. If the extracted index words are not present in any records of the exception solution map 420, then the integrated exception management manager can search the collection or library of reference notes to identify a list of reference notes containing the extracted index words. The extracted index words and the identified list of reference notes can then be added as a new record to the exception solution map 420. On the other hand, if the extracted index words are already present in one of the records of the exception solution map 420, then there is no need to search the collection of reference notes (thus can reduce the computation load and improve operational efficiency) because the list of reference notes containing the extracted index words are already known, and the exception solution map 420 does not need to be updated.

For an exception log entry contains no exception code 412, a descriptor can be derived from the exception solution map 420, and such descriptor can be included in the notification routed to the responsible administrator(s). In certain embodiments, the descriptor can include the index words 422 extracted from the exception log entry and the corresponding list (including, e.g., the links, titles, and/or other identifiers) of reference notes. Thus, upon receiving the notification, the responsible administrator(s) can consult the relevant reference notes to trouble shoot the underlying error conditions.

Example 6—Example Use Cases of Implementing Exception Handling Services

Figure 5:
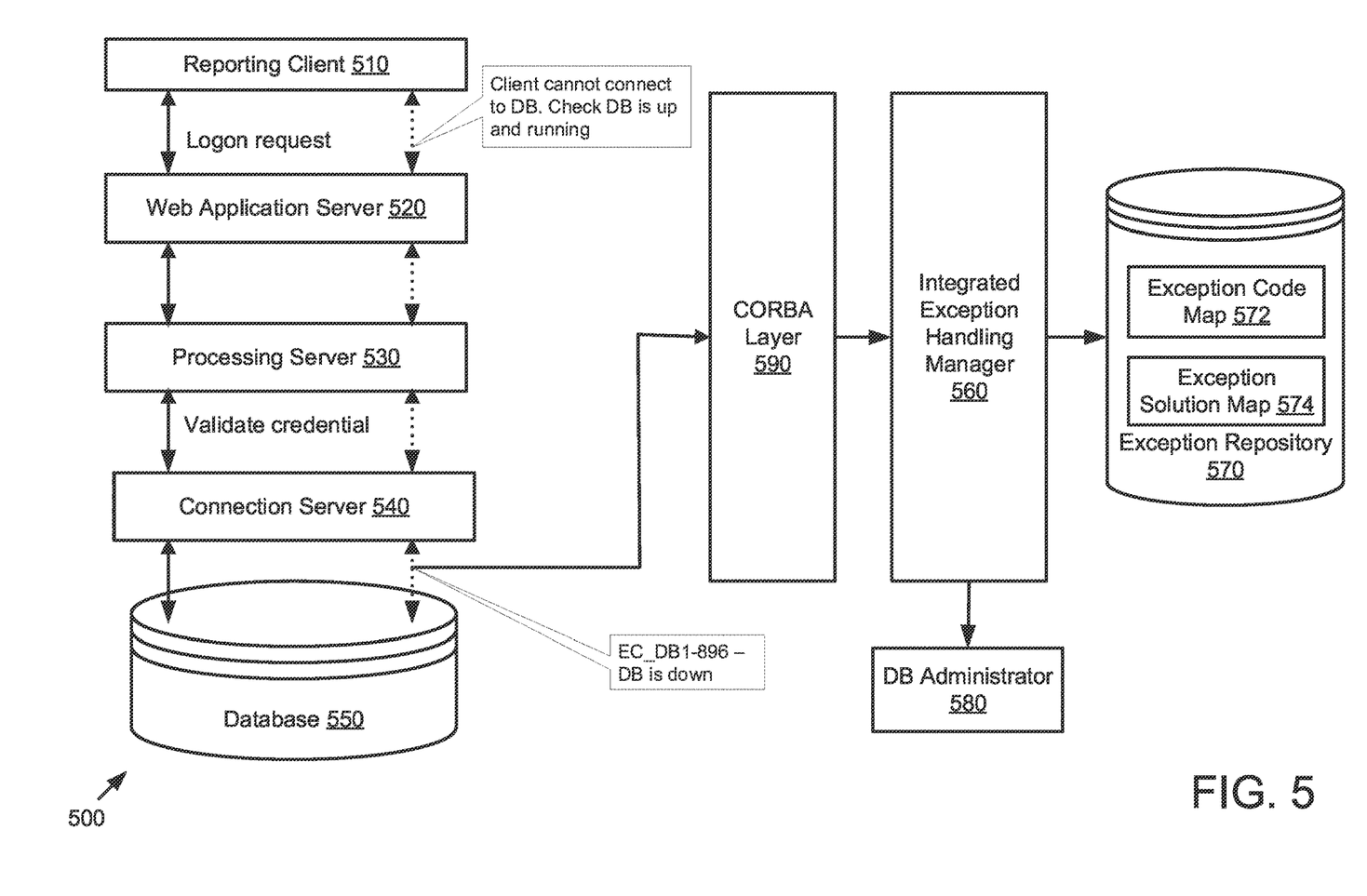
FIG. 5 is an example block diagram illustrating a use case of implementing integrated exception handling service based on an exception code map.

FIG. 5 is a block diagram of an example system 500 implementing integrated exception handling service based on an exception code map.

As shown, the system 500 includes a reporting client 510 which can be a reporting software that is configured to generate dashboards of reports. The reporting client 510 can interact with a web application server 520, which is connected to a processing server 530 for processing the reports. Through a connection server 540, the processing server 530 can communicate with a database 550 which stores the data that is used for report generation. Each of the computing components listed above (e.g., 510, 520, 530, 540, and 550) can be registered with and communicate with an integrated exception handling manager 560 through an interface layer 590 adopting the CORBA standard. As noted above, the integrated exception handling manager 560 can maintain an exception repository 570, which can include an exception code map 572 and an exception solution map 574.

In the depicted example, a user tried to log into the reporting client 510 but failed got an error message—"Client cannot connect to DB. Check DB is up and running" This login failure can trigger an exception log entry in an exception log maintained by the reporting client 510. In addition, the same failure can simultaneously trigger an exception log entry in another exception log maintained by the database 550. From the error message itself, the user may not be able to tell whether the source of the error occurred in the reporting client 510 or the database 550, or some other intermediate layers. Such ambiguity can be prevalent because the system 500 may be intentionally deigned to high technical details from end users for data security/privacy concerns and/or other reasons.

Without the integrated exception handling service described herein, a system administrator would have to analyze the exception logs in both the reporting client 510 and the database 550 to identify the source of the error and relay relevant information to responsible administrator(s). Such practice would be inefficient, especially when the user is interacting with real-time data. However, such problem can be overcome using the technology described herein. Because the integrated exception manager 560 is integrated with each registered computing component, when the failure occurs (e.g., at the database 550 is down), the detailed exception log entry containing the message "EC_DB1-896—DB is down" can be sent, via the interface layer 590, to an exception handler (e.g., 264) located in the integrated exception manager 560. An exception analyzer (e.g., 266) of the integrated exception manager 560 can then analyze the received exception log entry. In the depicted example, the exception log entry contains the exception code "EC_DB1-896." Thus, by looking up the exception code map 572 (which can be similar to 410), the exception analyzer can identify the exception definition (and identify the source of the exception) corresponding to the exception code, as well as proposed solution to resolve the exception. An alert generator (e.g., 268) of the integrated exception manager 560 can identify a database administrator 580 who is responsible for maintaining the database 550. Then, the alert generator can route a notification (which contains relevant information about the exception such as the exception definition and proposed solution) to the database administrator 580. Thus, the database administrators 580 can immediately receive relevant information about the exception and promptly take actions to resolve the underlying issues right after the user experienced the failure event.

While the above example describes a specific exception (i.e., database is down) for illustrative purpose, it is to be understood that the same principles can be applied to other use cases, such as exceptions caused by exceeding the message queue size of any computing component, exceptions caused by CPU and/or memory utilization exceeding a predefined limit, exceptions caused by network and/or I/O utilization exceeding a predefined limit, exceptions caused by load balancing request on a web server, etc.

Figure 6:
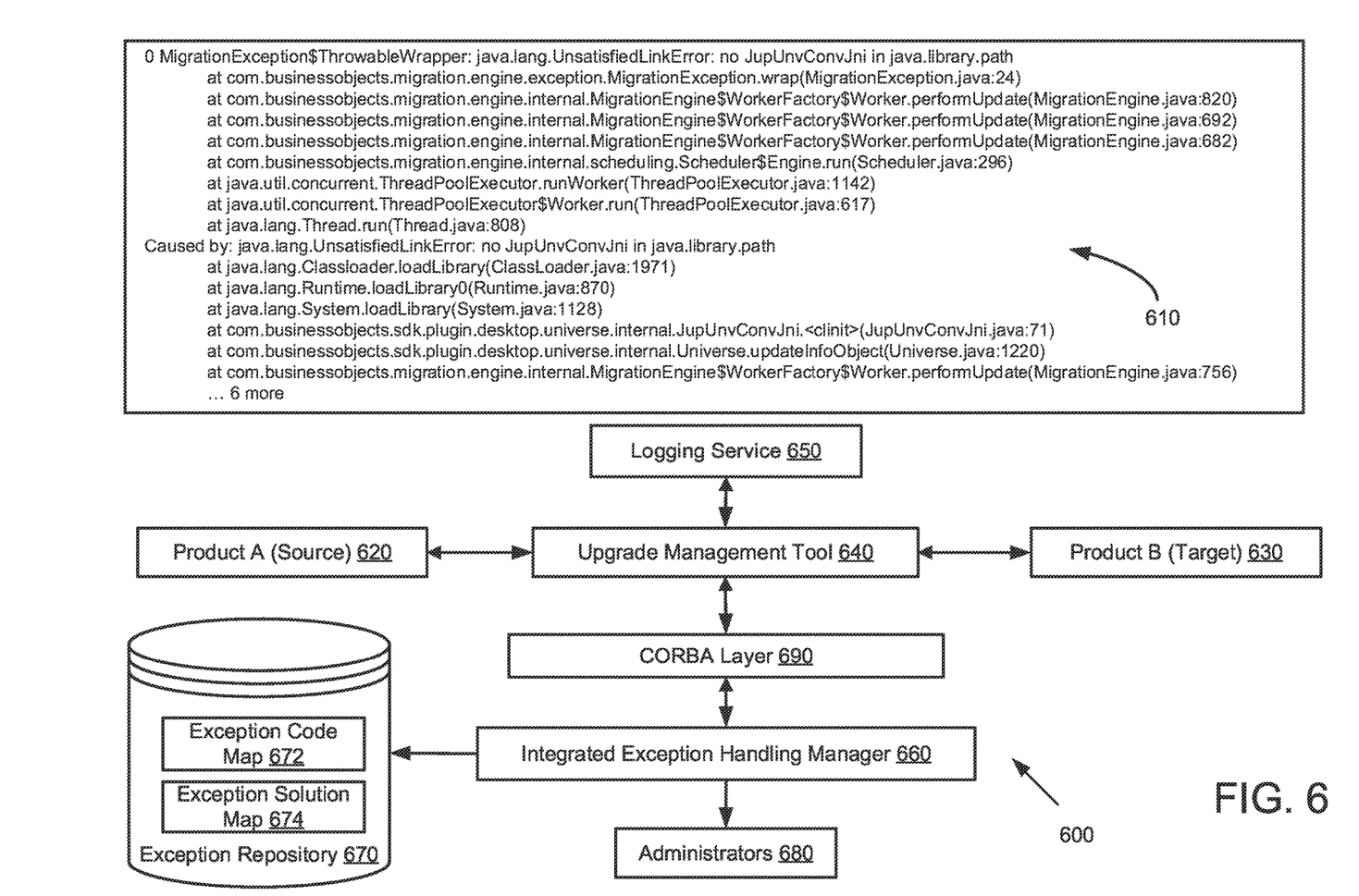
FIG. 6 is an example block diagram illustrating a use case of implementing integrated exception handling service based on an exception solution map.

FIG. 6 is a block diagram 600 illustrating another example system 600 implementing integrated exception handling service based on a solution map.

In this example, the system 600 includes an upgrade management tool 600 as a client, which can be used to migrate database content from a source machine 620 (e.g., Product A which has a lower version) to a target machine 630 (e.g., Product B which has a higher version). The upgrade management tool 600 can be deployed only when a customer upgrades the system 600, and can have its own exception logging service 650. Through an interface layer 690 adopting the CORBA standard, the upgrade management tool 600 (and other computing components of the system) can be registered with and communicate with an integrated exception handling manager 660. Similarly, the exception handling manager 660 can maintain an exception repository 670, which can include an exception code map 672 and an exception solution map 674.

In the depicted example, the system 600 abruptly crashed while a customer attempted to migrate data from Product A 620 to Product B 630. A corresponding exception log entry 610 is logged in an internal log maintained by the logging service 650 and simultaneously sent to the integrated exception handling manager 660. In this example, the exception log entry 610 contains no exception code. Thus, the integrated exception handling manager 660 can analyze the content of the exception log entry 610 to identify index words. For example, based on textual analysis, the integrated exception handling manager 660 can find the sentence "no JupUnvConvJni in java.library.path" in the line started by "Caused by" and further identify the index word "JupUnvConvJni." Then, the integrated exception handling manager 660 can search the exception solution map 674 to check if any of its record contains such index word. If yes, the list of reference notes corresponding to the index word "JupUnvConvJni" can be retrieved. Otherwise, the integrated exception handling manager 660 can search a collection or library of reference notes to identify a list of reference notes containing the index word "JupUnvConvJni." The extracted index word "JupUnvConvJni" and the identified list of reference notes can then be added as a new record to the exception solution map 674. Then, the integrated exception manager 660 can identify a respective administrator 680 who is responsible for the system upgrade, and send a notification (which contains the index word and related reference notes) to the administrator 680. Thus, the administrators 680 can immediately receive relevant information about the system crash and consult with the reference notes as necessary to troubleshoot the problem.

Example 7—Example Advantages

A number of advantages can be achieved via the technology described herein. For example, compared to conventional technologies where individual components in a heterogenous computing environment manage their respective exceptions in silos, the integrated exception handling service disclosed therein can harmonize exception handling of a diverse array of computing components in a heterogenous system, despite the computing components are provided by different vendors and have their own respective exception handling mechanisms. Such integrated exception handling service can be easily integrated with existing architecture as a "plug-in" through a simple registration process, after which an exception repository can be created that contains an exception code map and a library of reference notes sourced from the registered components. The integrated exception handling service can act as an intermediary moderator between each client/server and its respective administrator(s). Specifically, the integrated exception handling service can aggregate exception log entries generated from any registered computing component, perform failure analysis automatically, alert responsible administrator(s) immediately after an exception event, and provide actionable information to the responsible administrator(s). As a result, efficiency of exception management in the heterogenous computing environment can be improved, and delay or disruption caused by the exceptions can be reduced or minimized.

Example 8—Example Computing Systems

Figure 7:
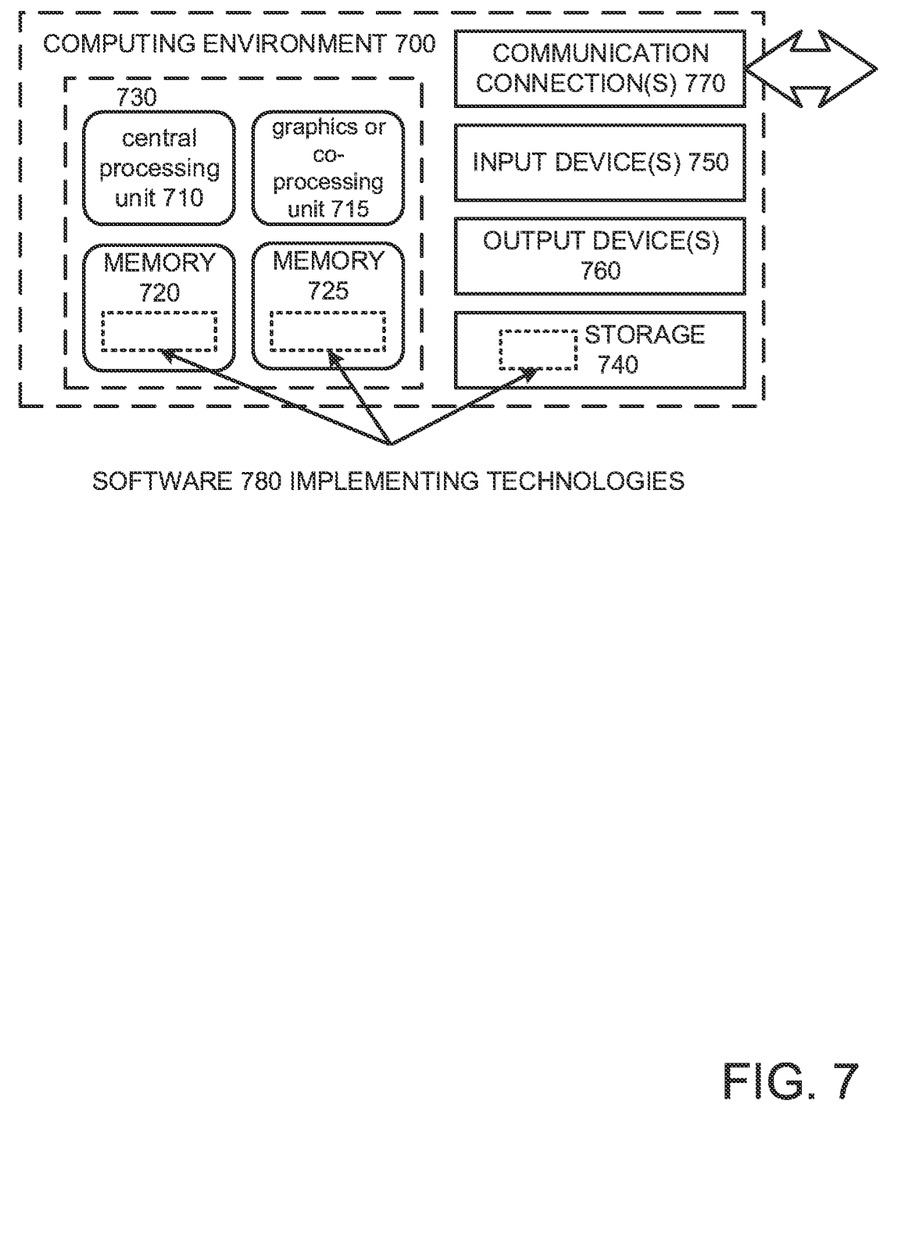
FIG. 7 is a block diagram of an example computing system in which described embodiments can be implemented.

FIG. 7 depicts an example of a suitable computing system 700 in which the described innovations can be implemented. The computing system 700 is not intended to suggest any limitation as to scope of use or functionality of the present disclosure, as the innovations can be implemented in diverse computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 can be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715.

A computing system 700 can have additional features. For example, the computing system 700 includes storage 740, one or more input devices 750, one or more output devices 760, and one or more communication connections 770, including input devices, output devices, and communication connections for interacting with a user. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 can be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software implementing one or more innovations described herein.

The input device(s) 750 can be an input device such as a keyboard, mouse, pen, or trackball, a voice input device, a scanning device, touch device (e.g., touchpad, display, or the like) or another device that provides input to the computing system 700. The output device(s) 760 can be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 9—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 10—Example Cloud Computing Environment

Figure 8:
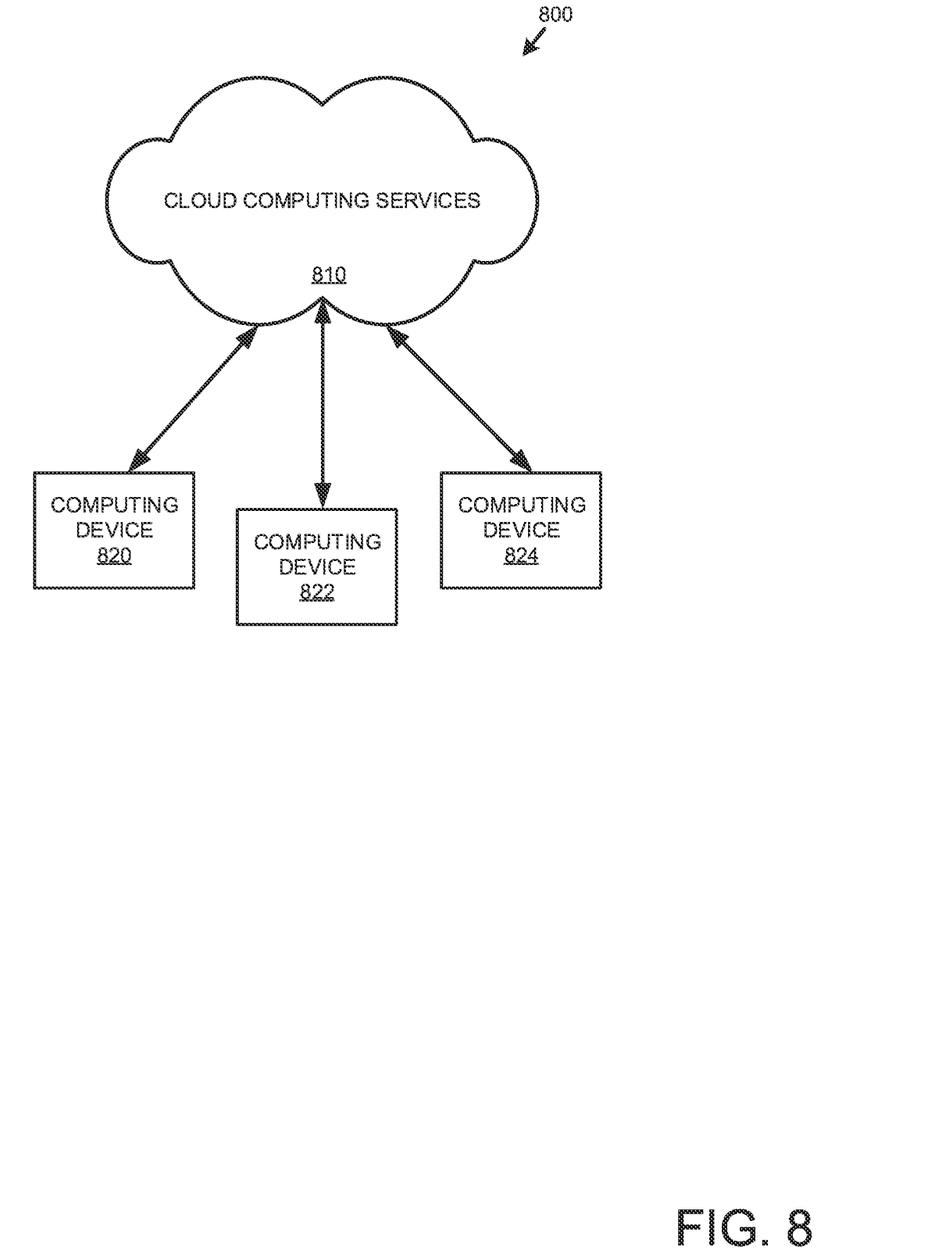
FIG. 8 is a block diagram of an example cloud computing environment that can be used in conjunction with the technologies described herein.

FIG. 8 depicts an example cloud computing environment 800 in which the described technologies can be implemented, including, e.g., the system disclosed above and other systems herein. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 823. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

In practice, cloud-based, on-premises-based, or hybrid scenarios can be supported.

Example 11—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 12—Example Embodiments

Any of the following embodiments can be implemented.

Clause 1. A computer-implemented method comprising: feeding exception log entries from a plurality of exception logs associated with respective heterogenous computing components into an aggregated exception log comprising aggregated exception log entries; mapping an aggregated exception log entry in the aggregated exception log to a corresponding exception identifier; identifying a descriptor describing an exception condition based on the exception identifier; determining one or more destinations corresponding to the aggregated exception log entry; and routing a notification comprising the descriptor to the one or more destinations.

Clause 2. The method of clause 1, further comprising registering the heterogenous computing components with an integrated exception handling service which maintains the aggregated exception log.

Clause 3. The method of clause 2, wherein the integrated exception handling service is configured to map aggregated exception log entries to respective destinations to which notifications can be routed.

Clause 4. The method of any one of clauses 2-3, wherein the integrated exception handling service maintains an exception repository which contains an exception code map and a collection of reference notes.

Clause 5. The method of clause 4, wherein the exception code map comprises a plurality of exception codes associated with the heterogenous computing components, wherein the exception identifier corresponding to the aggregated exception log entry matches one of the exception codes.

Clause 6. The method of clause 5, wherein the exception code map comprises exception definitions corresponding to the plurality of exception codes, wherein the descriptor comprises an exception definition corresponding to the one of the exception codes matching the exception identifier.

Clause 7. The method of any one of clauses 5-6, wherein the exception code map comprises proposed solutions corresponding to the plurality of exception codes, wherein the descriptor comprises a proposed solution corresponding to the one of the exception codes matching the exception identifier.

Clause 8. The method of any one of clauses 4-7, further comprising extracting one or more index words from the aggregated exception log entry, wherein the exception identifier comprises the one or more index words.

Clause 9. The method of clause 8, further comprising identifying one or more reference notes containing the one or more index words from the collection of reference notes, wherein the descriptor comprises links to the one or more reference notes.

Clause 10. The method of any one of clauses 2-9, wherein the integrated exception handling service interacts with the heterogenous computing components via a Common Object Request Broker Architecture (CORBA).

Clause 11. A computing system comprising: memory; one or more hardware processors coupled to the memory; and one or more computer readable storage media storing instructions that, when loaded into the memory, cause the one or more hardware processors to perform operations comprising: feeding exception log entries from a plurality of exception logs associated with respective heterogenous computing components into an aggregated exception log comprising aggregated exception log entries; mapping an aggregated exception log entry in the aggregated exception log to a corresponding exception identifier; identifying a descriptor describing an exception condition based on the exception identifier; determining one or more destinations corresponding to the aggregated exception log entry; and routing a notification comprising the descriptor to the one or more destinations.

Clause 12. The system of clause 11, further comprising registering the heterogenous computing components with an integrated exception handling service which maintains the aggregated exception log.

Clause 13. The system of clause 12, wherein the integrated exception handling service is configured to map aggregated exception log entries to respective destinations to which notifications can be routed.

Clause 14. The system of any one of clauses 12-13, wherein the integrated exception handling service maintains an exception repository which contains an exception code map and a collection of reference notes.

Clause 15. The system of clause 14, wherein the exception code map comprises a plurality of exception codes associated with the heterogenous computing components, wherein the exception identifier corresponding to the aggregated exception log entry matches one of the exception codes.

Clause 16. The system of clause 15, wherein the exception code map comprises exception definitions corresponding to the plurality of exception codes, wherein the descriptor comprises an exception definition corresponding to the one of the exception codes matching the exception identifier.

Clause 17. The system of any one of clauses 15-16, wherein the exception code map comprises proposed solutions corresponding to the plurality of exception codes, wherein the descriptor comprises a proposed solution corresponding to the one of the exception codes matching the exception identifier.

Clause 18. The system of any one of clauses 14-17, further comprising extracting one or more index words from the aggregated exception log entry, wherein the exception identifier comprises the one or more index words.

Clause 19. The system of clause 18, further comprising identifying one or more reference notes containing the one or more index words from the collection of reference notes, wherein the descriptor comprises links to the one or more reference notes.

Clause 20. One or more computer-readable media having encoded thereon computer-executable instructions causing one or more processors to perform a method comprising: registering a plurality of heterogenous computing components with an integrated exception handling service which maintains an aggregated exception log comprising aggregated exception log entries; feeding exception log entries from a plurality of exception logs associated with respective heterogenous computing components into the aggregated exception log; mapping an aggregated exception log entry in the aggregated exception log to a corresponding exception identifier; identifying a descriptor describing an exception condition based on the exception identifier; determining one or more destinations corresponding to the aggregated exception log entry; and routing a notification comprising the descriptor to the one or more destinations; wherein the integrated exception handling service maintains an exception repository which contains an exception code map; wherein the exception code map comprises a plurality of exception codes associated with the heterogenous computing components, wherein the exception identifier corresponding to the aggregated exception log entry matches one of the exception codes; and wherein the exception code map comprises proposed solutions corresponding to the plurality of exception codes, wherein the descriptor comprises a proposed solution corresponding to the one of the exception codes matching the exception identifier.

Example 13—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
registering a plurality of heterogenous computing components with an integrated exception handling service which maintains an aggregated exception log, wherein the registering comprises storing known exceptions of the plurality of heterogenous computing components in an exception repository of the integrated exception handling service;
only after registering the plurality of heterogenous computing components, feeding exception log entries from a plurality of exception logs associated with respective heterogenous computing components into the aggregated exception log to generate aggregated exception log entries;
mapping an aggregated exception log entry in the aggregated exception log to a corresponding exception identifier;
identifying a descriptor describing an exception condition based on the exception identifier;
determining one or more destinations corresponding to the aggregated exception log entry; and
routing a notification comprising the descriptor to the one or more destinations.

2. The method of claim 1, wherein the integrated exception handling service is configured to map aggregated exception log entries to respective destinations to which notifications can be routed.

3. The method of claim 1, wherein the exception repository contains an exception code map and a collection of reference notes.

4. The method of claim 3, wherein the exception code map comprises a plurality of exception codes associated with the heterogenous computing components, wherein the exception identifier corresponding to the aggregated exception log entry matches one of the exception codes.

5. The method of claim 4, wherein the exception code map comprises exception definitions corresponding to the plurality of exception codes, wherein the descriptor comprises an exception definition corresponding to the one of the exception codes matching the exception identifier.

6. The method of claim 4, wherein the exception code map comprises proposed solutions corresponding to the plurality of exception codes, wherein the descriptor comprises a proposed solution corresponding to the one of the exception codes matching the exception identifier.

7. The method of claim 3, further comprising extracting one or more index words from the aggregated exception log entry, wherein the exception identifier comprises the one or more index words.

8. The method of claim 7, further comprising identifying one or more reference notes containing the one or more index words from the collection of reference notes, wherein the descriptor comprises links to the one or more reference notes.

9. The method of claim 1, wherein the integrated exception handling service interacts with the heterogenous computing components via a Common Object Request Broker Architecture (CORBA).

10. A computing system comprising:
memory;
one or more hardware processors coupled to the memory; and
one or more computer readable storage media storing instructions that, when loaded into the memory, cause the one or more hardware processors to perform operations comprising:
registering a plurality of heterogenous computing components with an integrated exception handling service which maintains an aggregated exception log, wherein the registering comprises storing known exceptions of the plurality of heterogenous computing components in an exception repository of the integrated exception handling service;
only after registering the plurality of heterogenous computing components, feeding exception log entries from a plurality of exception logs associated with respective heterogenous computing components into the aggregated exception log to generate aggregated exception log entries;
mapping an aggregated exception log entry in the aggregated exception log to a corresponding exception identifier;
identifying a descriptor describing an exception condition based on the exception identifier;
determining one or more destinations corresponding to the aggregated exception log entry; and
routing a notification comprising the descriptor to the one or more destinations.

11. The system of claim 10, wherein the integrated exception handling service is configured to map aggregated exception log entries to respective destinations to which notifications can be routed.

12. The system of claim 10, wherein the exception repository contains an exception code map and a collection of reference notes.

13. The system of claim 12, wherein the exception code map comprises a plurality of exception codes associated with the heterogenous computing components, wherein the exception identifier corresponding to the aggregated exception log entry matches one of the exception codes.

14. The system of claim 13, wherein the exception code map comprises exception definitions corresponding to the plurality of exception codes, wherein the descriptor comprises an exception definition corresponding to the one of the exception codes matching the exception identifier.

15. The system of claim 13, wherein the exception code map comprises proposed solutions corresponding to the plurality of exception codes, wherein the descriptor comprises a proposed solution corresponding to the one of the exception codes matching the exception identifier.

16. The system of claim 12, further comprising extracting one or more index words from the aggregated exception log entry, wherein the exception identifier comprises the one or more index words.

17. The system of claim 16, further comprising identifying one or more reference notes containing the one or more index words from the collection of reference notes, wherein the descriptor comprises links to the one or more reference notes.

18. One or more non-transitory computer-readable media having encoded thereon computer-executable instructions causing one or more processors to perform a method comprising:
    registering a plurality of heterogenous computing components with an integrated exception handling service which maintains an aggregated exception log comprising aggregated exception log entries, wherein the registering comprises storing known exceptions of the plurality of heterogenous computing components in an exception repository of the integrated exception handling service;
    only after registering the plurality of heterogenous computing components, feeding exception log entries from a plurality of exception logs associated with respective heterogenous computing components into the aggregated exception log;
    mapping an aggregated exception log entry in the aggregated exception log to a corresponding exception identifier;
    identifying a descriptor describing an exception condition based on the exception identifier;
    determining one or more destinations corresponding to the aggregated exception log entry; and
    routing a notification comprising the descriptor to the one or more destinations;
    wherein the exception repository contains an exception code map;
    wherein the exception code map comprises a plurality of exception codes associated with the heterogenous computing components, wherein the exception identifier corresponding to the aggregated exception log entry matches one of the exception codes; and
    wherein the exception code map comprises proposed solutions corresponding to the plurality of exception codes, wherein the descriptor comprises a proposed solution corresponding to the one of the exception codes matching the exception identifier.

* * * * *